R. MUELLER.
FUR BEATING MACHINE.
APPLICATION FILED JAN. 6, 1909.
962,236.
Patented June 21, 1910.
3 SHEETS—SHEET 1.
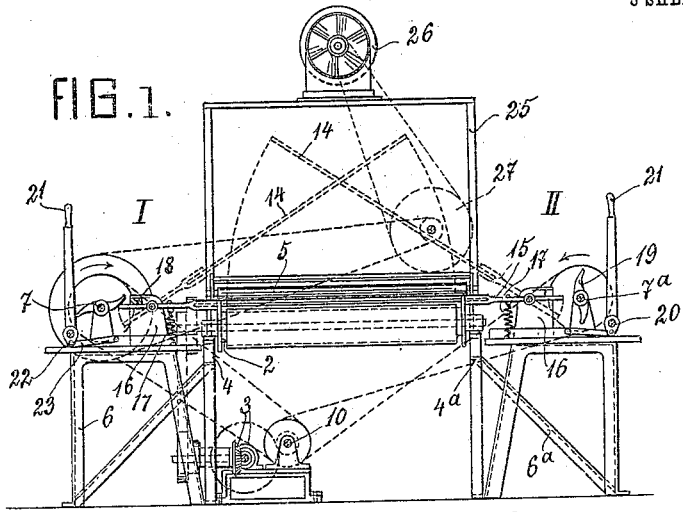
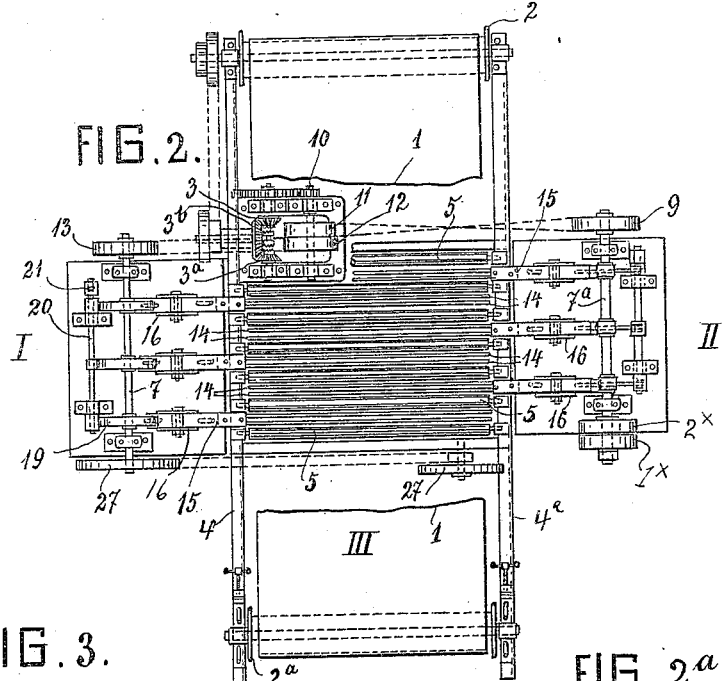
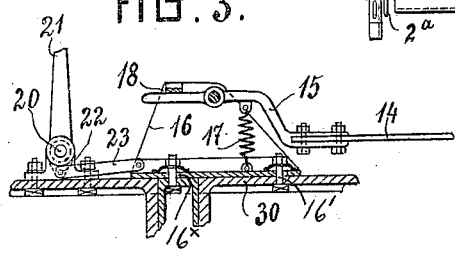
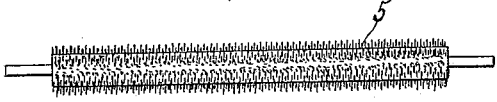
WITNESSES
W. P. Burke
Wm. G. Smith
INVENTOR
Reinhold Mueller
BY
ATTY.

R. MUELLER.
FUR BEATING MACHINE.
APPLICATION FILED JAN. 6, 1909.

962,236.

Patented June 21, 1910.
3 SHEETS—SHEET 2.

WITNESSES

INVENTOR
Reinhold Mueller

R. MUELLER.
FUR BEATING MACHINE.
APPLICATION FILED JAN. 6, 1909.

962,236.

Patented June 21, 1910.
3 SHEETS—SHEET 3.

WITNESSES

INVENTOR
Reinhold Mueller
BY
ATTY

UNITED STATES PATENT OFFICE.

REINHOLD MUELLER, OF STUTTGART, GERMANY.

FUR-BEATING MACHINE.

962,236.  Specification of Letters Patent.  Patented June 21, 1910.

Application filed January 6, 1909. Serial No. 470,958.

*To all whom it may concern:*

Be it known that I, REINHOLD MUELLER, subject of the German Emperor, residing at No. 36 Koenigstrasse, Stuttgart, Germany, have invented new and useful Improvements in Fur-Beating Machines, of which the following is a specification.

This invention relates to a fur beating machine of the known type in which the beating action takes place at right angles to the feed of the articles to be beaten, which are moved past beater bars, mounted in holders, by means of a feed-table or band and are kept down by rollers parallel to the beater bars, whereupon the adjustment of the beating force can be effected by the moving of the shaft carrying the beaters in relation to a cam shaft. In this fur beating machine, not only the depressing rollers can be spring mounted on the top of the feeding table or band and the supporting rollers on the underside thereof and also adapted to be raised by levers in order to remove the beating table or band from the beaters, but brushes or the like may also be arranged in front of the casing or receptacle in order to depress and clean the article to be beaten and also to tighten the casing at the same time.

The invention includes the arrangement of depressing rollers between the individual beaters which rollers are provided with bristles. This arrangement renders the beating machine suitable for beating all kinds of fur. Furthermore, all rollers can be simultaneously lifted off the beating track or band in order to be able to place thick pieces or layers of fur freely and without loss of time on the beating places between the rollers.

The invention is shown by way of example in the accompanying drawings:—

Figure 4:
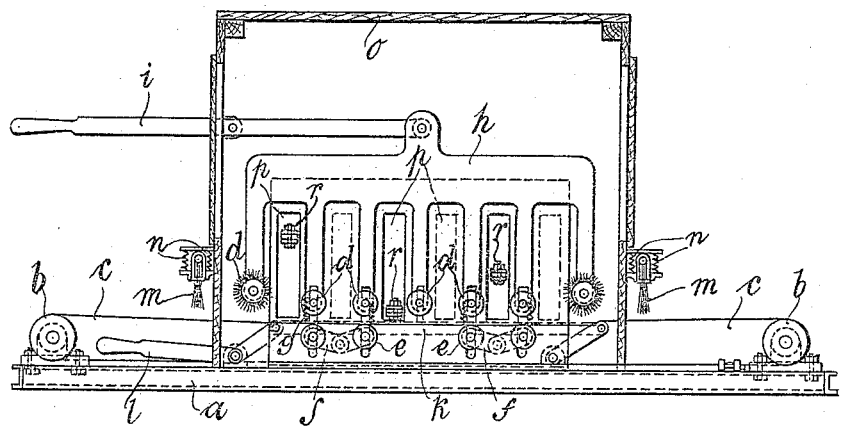
Figure 5:
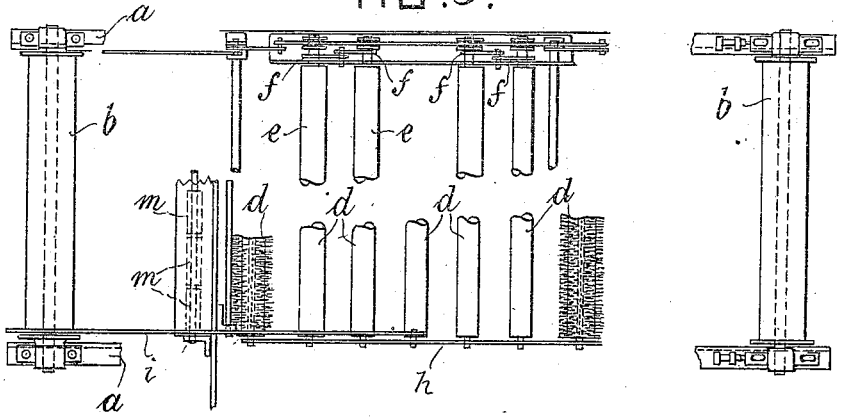
Figure 6:
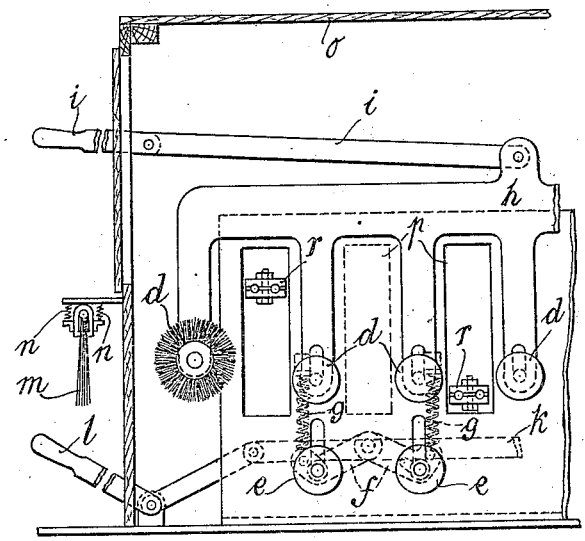
Figure 7:
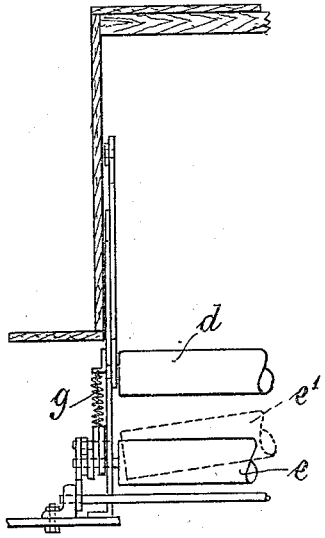
Figure 8:
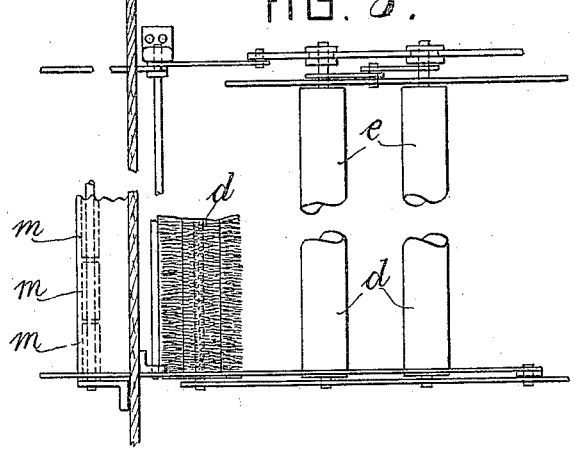

Figure 1 is a vertical cross-section of a fur beating machine with reciprocating table. Fig. 2 is a plan view of the invention shown in Fig. 1. Fig. 2$^a$ represents a depressing roller covered with bristles. Fig. 3 is a longitudinal section on an enlarged scale through the beating device I, Fig. 2. Fig. 4 is a longitudinal section through a modified form of the fur beating machine. Fig. 5 is a fragmentary plan view showing parts of the upper and lower rollers shown in Fig. 4. Fig. 6 shows a portion of the invention shown in Fig. 4 on an enlarged scale. Fig. 7 is a side elevation of a portion of the invention shown in Fig. 6 and, Fig. 8 is a view similar to Fig. 5 showing some of the parts of that view on an enlarged scale.

In the fur beating machine according to Figs. 1–3, two beating devices I, II are arranged opposite each other at the sides of the table III provided with an endless band 1. The band 1 passes as usual over two rollers 2, 2$^a$, one of which is capable of adjustment toward and from the other; the operation is effected in such a manner by intermediate gear fixed below the table that the feeding direction of the band 1 can be reversed by a conical reversing gear 3, 3$^a$, 3$^b$. Thus one person can attend to the machine without leaving his place. The casing 25 has vertical slots therein for receiving the rollers 5, said casing being secured at both longitudinal sides 4, 4$^a$ of the table III.

The beating device proper comprises the frames 6, 6$^a$, on which are mounted the cam shafts 7, 7$^a$, which simultaneously serve as driving shafts for the whole machine. In the double arrangement as shown, the main driving gear is provided on the right side and consists of a fast and a loose pulley 2$^x$ and 1$^x$, respectively. The pulley 9 as shown at the other end of the shaft 7$^a$ drives the pulley 11 on shaft 10 of the gearing arranged under the table, while a second pulley 12 on shaft 10 actuates the driving pulley 13 of the beating device I on the left side. The beaters 14 are secured in holders 15 in pairs, as shown by way of example, which holders are adapted to oscillate in standards 16 and be tensioned by a spring 17 on the inner side of the fulcrum, whereas there is provided on the other side in the standard 16, a rubber block 18, which serves as a buffer during the beating action for the rear end of the holder projecting over the fulcrum. The cam shafts 7, 7$^a$ carry as many cam disks 19 as there are holders 15 and at each revolution, they each produce by beating against the holder ends as many single blows as there are arms or cams on one cam disk 19; according to the drawings, the cam disks 19 are shown with two arms by way of example. In order to be able to regulate the force of the blows, the standards 16 can be adjusted at right angles to the cam shaft 7, 7$^a$ and all simultaneously by turning the lever 21 secured to shaft 20 by means of cranks 22 mounted on the latter and provided with crank rods 23 engaging with the standards 16 which are secured to the frame by bolts 16' which pass through slots 16ˣ in said standards. A suction fan 26 with gear 27 is arranged over the dust collecting receptacle or casing 25. See Fig. 1.
In the fur beating machine according to Figs. 4–8, the fur beating machine is mounted on the frame $a$ and the band $c$ stretched over the rollers $b$, $b$. Rollers $d$, $d$, are mounted over the band and rollers $e$, $e$, below the same. The rollers $e$, $e$, are mounted in levers $f$, $f$, which can be pulled upward by spring power. All of the top rollers $d$, $d$, which are mounted in the frames $h$ are raised from the band $c$ by the lever $i$, while all of the bottom rollers $e$, $e$, whose bearing levers $f$, $f$, are mounted in the frame $k$ can be moved from the band $c$ by the lever $l$. Brushes $m$ are located above the opening in the receptacle through which the article to be cleaned passes, the said brushes being adapted to engage with the articles and the brushes are mounted to have a swinging movement, as shown in Fig. 6. Two springs $n$ are provided which tend to hold the brushes in a vertical position. The beaters $r$ are moved through the openings $p$, and adapted to beat the fur as in the other arrangements. The bottom rollers $e$, $e$, assume the inclined position $e'$ Fig. 7, when fur of different thicknesses pass through. The first and last top rollers $d$ are covered with brushes for increasing the cleaning effect of the beating machine. The other top rollers $d$ have a rough surface.
Having now particularly described and ascertained the nature of my said invention and in what manner the same is to be performed, I declare that what I claim and wish to secure by Letters Patent is:—

1. A fur beating machine comprising a movable feeding band, beater bars arranged at right angles to the band, means for oscillating said bars, a series of parallel rollers arranged over the band and between which the beater bars strike, and means for simultaneously adjusting the beater bars.

2. A fur beating machine comprising a movable feeding band, a series of parallel movable feeding band, rollers located above the band, beater bars arranged at right angles to the band and adapted to strike between the rollers, means for oscillating said bars, a bracket supporting a series of bars, and means for moving the bracket to adjust the position of the bars.

3. A fur beating machine comprising a movable feeding band, rollers located above the band, means for yieldingly supporting said rollers, supporting rollers on the underside of the band, means for moving said lower rollers from the band, and beaters and means for simultaneously moving the upper rollers from the band.

In testimony whereof I have signed my name to this specification in the presence of two subscribing witnesses.

REINHOLD MUELLER.

Witnesses:
FRIDA KLAIBER,
PAULINE KLAIBER.